(12) United States Patent
Ma et al.

(10) Patent No.: US 10,219,489 B2
(45) Date of Patent: Mar. 5, 2019

(54) SQUEAKY PET TOY

(71) Applicant: TONGFU MANUFACTURING CO., LTD., Nanjing, Jiangsu Province (CN)

(72) Inventors: Yaomin Ma, Nanjing (CN); Wen Zhang, Nanjing (CN)

(73) Assignee: TONGFU MANUFACTURING CO., LTD., Nanjing (CN)

(*) Notice: Subject to any disclaimer, the term of this patent is extended or adjusted under 35 U.S.C. 154(b) by 216 days.

(21) Appl. No.: 15/394,113

(22) Filed: Dec. 29, 2016

(65) Prior Publication Data

US 2017/0208776 A1  Jul. 27, 2017

(30) Foreign Application Priority Data

Oct. 30, 2015  (CN) .......................... 2015 2 0852232

(51) Int. Cl.
*A01K 15/02*  (2006.01)
*A63H 5/00*  (2006.01)

(52) U.S. Cl.
CPC .............. *A01K 15/025* (2013.01); *A63H 5/00* (2013.01)

(58) Field of Classification Search
CPC .... A01K 15/025; A01K 29/00; A01K 5/0114; A01K 15/026; A63H 5/00; A63H 3/28
USPC ...... 119/707, 709, 702, 51.04; 446/184, 188
See application file for complete search history.

(56) References Cited

U.S. PATENT DOCUMENTS

| 620,087 | A | * | 2/1899 | Stein ....................... A63B 43/00 473/571 |
| 2,928,208 | A | * | 3/1960 | Wintriss ................... A63H 5/00 411/918 |
| RE29,050 | E | * | 11/1976 | Hakim ...................... A63H 3/28 446/184 |
| 6,935,274 | B1 | * | 8/2005 | Rothschild ........... A01K 15/025 119/702 |
| 7,169,008 | B2 | * | 1/2007 | Ritchey ................ A01K 15/025 119/702 |
| 7,736,213 | B2 | * | 6/2010 | Willinger ................. A63H 3/28 119/707 |
| 7,833,079 | B2 | * | 11/2010 | Willinger ................. A63H 5/00 119/707 |
| 8,235,762 | B2 | * | 8/2012 | Rutherford .............. A63H 5/00 119/707 |
| 9,814,994 | B1 | * | 11/2017 | Woods ...................... A63H 5/00 |
| 9,992,975 | B2 | * | 6/2018 | Wolfe, Jr. ............ A01K 15/025 |
| 2002/0115377 | A1 | * | 8/2002 | Herrenbruck ........ A01K 15/025 446/475 |

(Continued)

*Primary Examiner* — Yvonne R Abbott-Lewis
(74) *Attorney, Agent, or Firm* — Oliff PLC

(57) ABSTRACT

A squeaky pet toy, including a squeaker, a bladder, and an outer layer, where a squeaker mounting hole is provided on the bladder; Squeaker is provided in the mounting hole; the outer layer is wrapped on the bladder's surface; a first mounting inverse buckle is provided on a top end of the squeaker; the first mounting inverse buckle of the squeaker does not interfere with the outer layer; a second mounting inverse buckle in the shape of annular ring is formed in the middle of an outer wall of the squeaker; a lower edge of mounting hole extends downwards to form a mounting boss, and second mounting inverse buckle is clamped below the mounting boss. The squeaker's top end can protrude from the bladder, and the squeaker can be fastened in the bladder and does not easily fall off. This improves the toy's sound production, and extends product life.

6 Claims, 5 Drawing Sheets

(56) References Cited

U.S. PATENT DOCUMENTS

| | | | | |
|---|---|---|---|---|
| 2010/0251966 A1* | 10/2010 | Benson | ........... | A01K 5/0114 119/51.01 |
| 2011/0005468 A1* | 1/2011 | Piety | ........... | A01K 15/025 119/707 |
| 2011/0048338 A1* | 3/2011 | Specht | ........... | A01K 15/026 119/709 |
| 2011/0214617 A1* | 9/2011 | Markham | ........... | A01K 15/025 119/707 |
| 2012/0073514 A1* | 3/2012 | Hansen | ........... | A01K 15/025 119/707 |
| 2012/0090554 A1* | 4/2012 | Nunn | ........... | A01K 15/025 119/707 |
| 2012/0192807 A1* | 8/2012 | Rutherford | ........... | A01K 15/025 119/707 |
| 2014/0033988 A1* | 2/2014 | Watts | ........... | A01K 15/025 119/707 |
| 2014/0109841 A1* | 4/2014 | Vap | ........... | A01K 15/025 119/707 |
| 2015/0289482 A1* | 10/2015 | Nunn | ........... | A01K 15/025 119/709 |
| 2016/0081303 A1* | 3/2016 | Simon | ........... | A01K 15/025 119/709 |

* cited by examiner

SQUEAKY PET TOY

BACKGROUND

Technical Field

This utility model relates to a pet toy, and in particular, to a squeaky pet toy.

Related Art

Air-driven sound production apparatuses mainly produce sounds when air flows through an opening of a squeaker, and triggers a reed mounted therein. At present, most of the air-driven sound production apparatuses are applied to plush toys, each of which consists of a bladder and a plush cover. A complete air-driven sound production apparatus is formed by leaving a mounting hole on the bladder and then inserting a squeaker into the mounting hole.

To fasten the squeaker, an upper edge of a top end of the squeaker generally protrudes outwards to form an inverse buckle. An outer edge of an opening of a top end of the mounting hole on the bladder extends to form an engagement platform; the squeaker is fastened on the bladder by means of the mounting inverse buckle and the engagement platform. Then, a squeaky plush toy is formed by wrapping a cover layer, such as plush or cotton cloth, on a surface of the bladder. Further, it is found that all the squeakers of the existing squeaky plush toys are wrapped within the outer layer.

Certainly, this has an adverse effect on the sound production of the plush toy. If the squeaker is exposed from the outer layer, the squeaker easily falls out of the bladder. To solve this problem, a squeaky pet toy, a squeaker of which is exposed from an outer layer, and is fastened in a bladder and does not easily fall off, is designed.

SUMMARY

The objective of this utility model is to provide a squeaky pet toy, a squeaker of which is exposed from an outer layer, and is fastened in a bladder and does not easily fall off.

Therefore, this utility model provides a squeaky pet toy, including a squeaker, a bladder, and an outer layer, where a squeaker mounting hole is provided on the bladder; the squeaker is provided in the mounting hole; the outer layer is wrapped on a surface of the bladder; a first mounting inverse buckle is provided on a top end of the squeaker; the first mounting inverse buckle of the squeaker does not interfere with the outer layer, which means that the outer layer does not contact the mounting inverse buckle, and does not provide an additional fastening force; a second mounting inverse buckle in the shape of annular ring is formed in the middle of an outer wall of the squeaker; a lower edge of the mounting hole extends downwards to form a mounting boss, and the second mounting inverse buckle is clamped below the mounting boss.

The first mounting inverse buckle is exposed from the outer layer, so that an opening of the squeaker on a top surface of the first mounting inverse buckle is exposed, thereby facilitating sound transmission. The lower edge of the mounting hole on the bladder extends towards a center of the bladder so as to form a mounting boss, which can clamp the second mounting inverse buckle on the squeaker there below, so that the squeaker is fastened in the bladder, and does not easily fall off.

Further, a through hole with an inner diameter the same as that of the mounting hole is provided on the outer layer, where the through hole is aligned to the mounting hole. Providing the through hole on the outer layer can prevent the opening of the squeaker from being covered by the outer layer, so that sound production of the squeaker is not affected.

Still further, the top surface of the first mounting inverse buckle is lower than an upper edge of the through hole. If the top surface of the first mounting inverse buckle protrudes from the through hole, on one aspect, appearance of the toy is affected, and on the other aspect, a top surface of the squeaker is easily worn out, and the product life is shortened.

Preferably, the second mounting inverse buckle is concave-arc shaped. The fastening effect is good, and the squeaker does not easily fall off from the bladder.

Preferably, the bladder is spherical.

Preferably, the outer layer is a felt layer or cloth decorative layer.

The beneficial effect of the this utility model: according to the squeaky pet toy provided by this utility model, the squeaker can be exposed from the outer layer, and meanwhile the squeaker can be fastened in the bladder and does not easily fall off, and this improves the effect of sound production of the toy to some extent, and extends the product life.

REFERENCE SIGNS

1, squeaker; 1.1, first mounting inverse buckle; 1.2, second mounting inverse buckle; 1.3, opening of the squeaker; 2, bladder; 2.1, mounting hole; 2.2, mounting boss; 3, outer layer; 3.1, through hole.

DETAILED DESCRIPTION

This utility model is further illustrated below with reference to the accompanying drawings and specific implementation manners.

Embodiment

Figure 1:
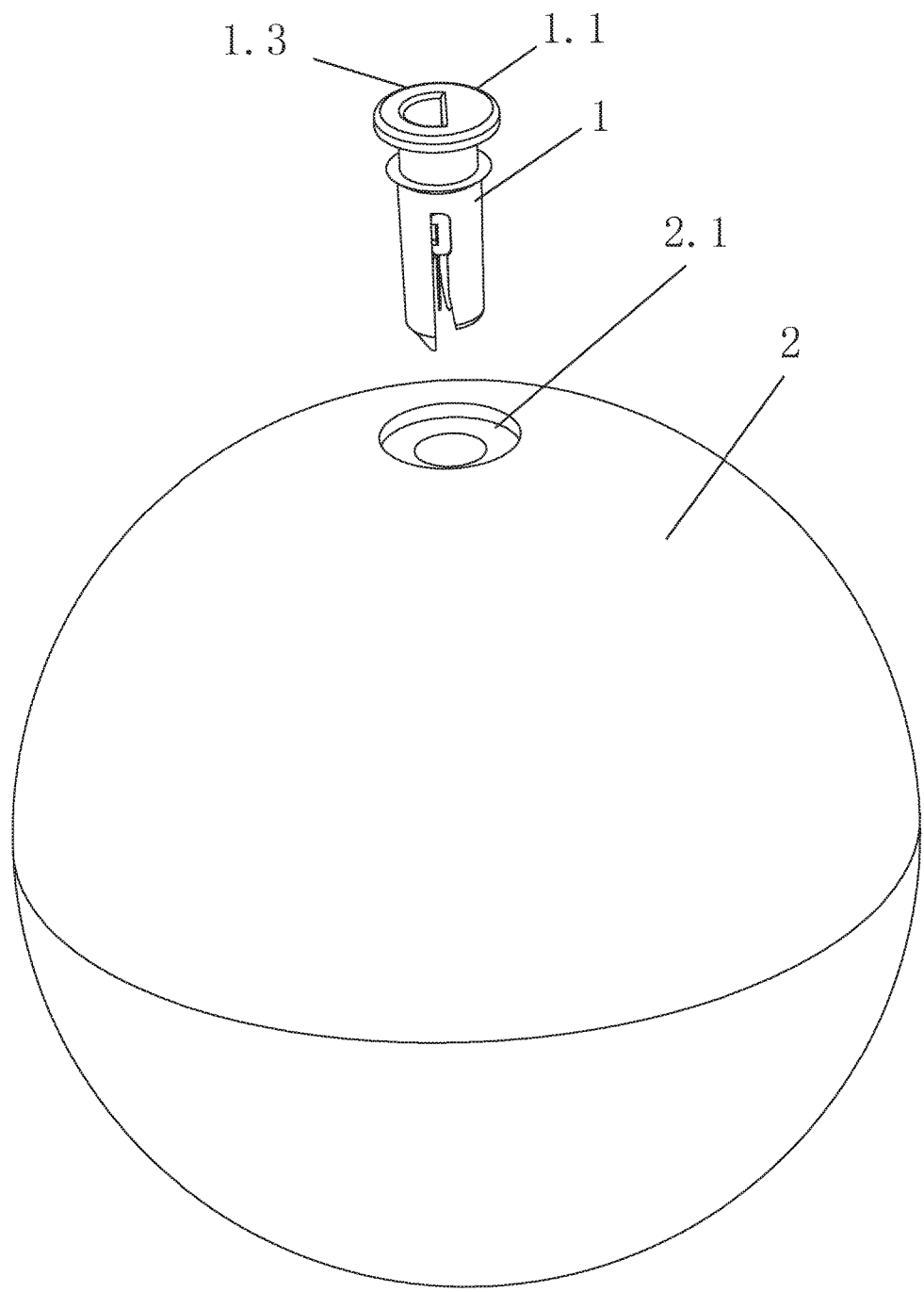
FIG. 1 is a schematic diagram of installation of an existing squeaky pet toy.
Figure 2:
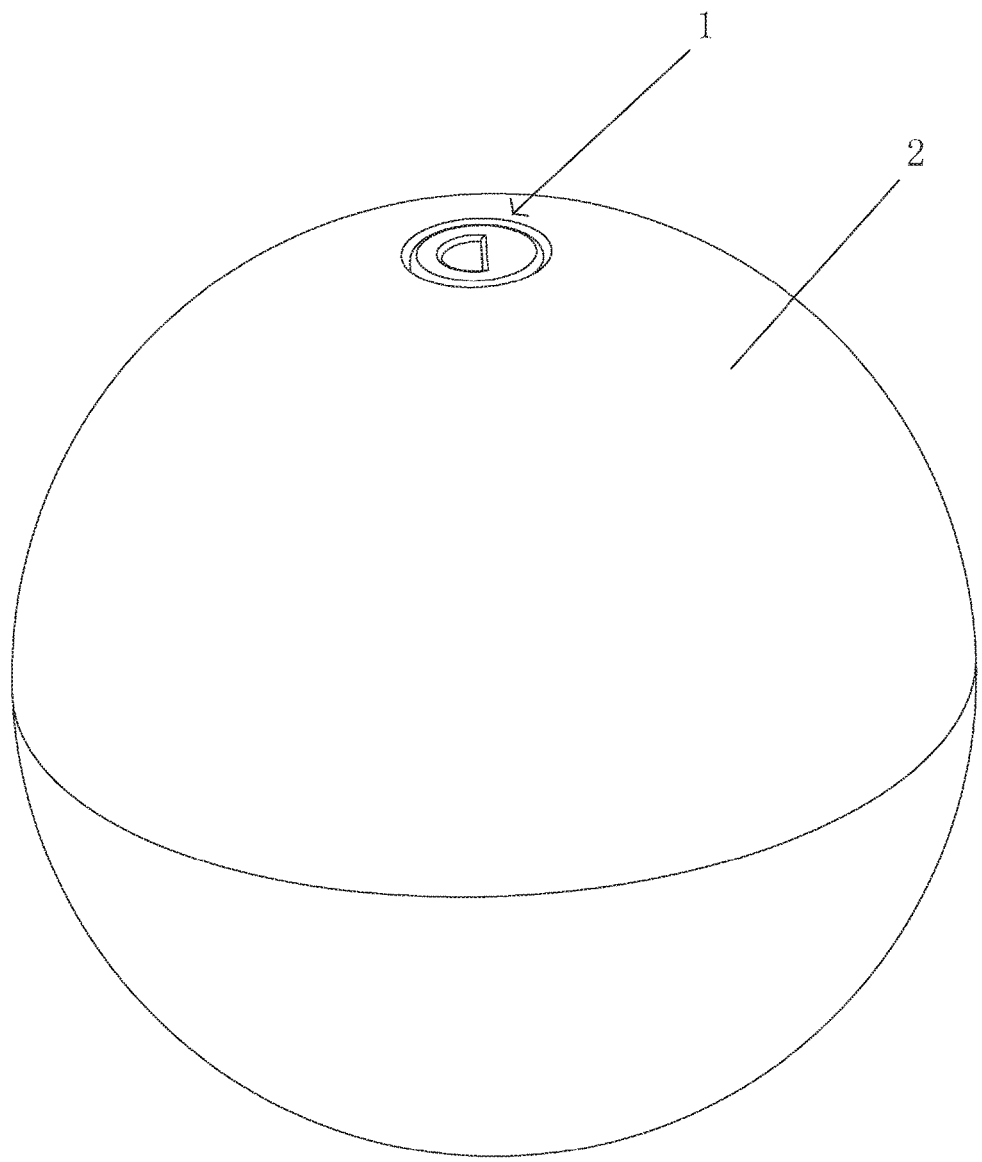
FIG. 2 is a schematic diagram of the existing squeaky pet toy after the installation.
Figure 3:
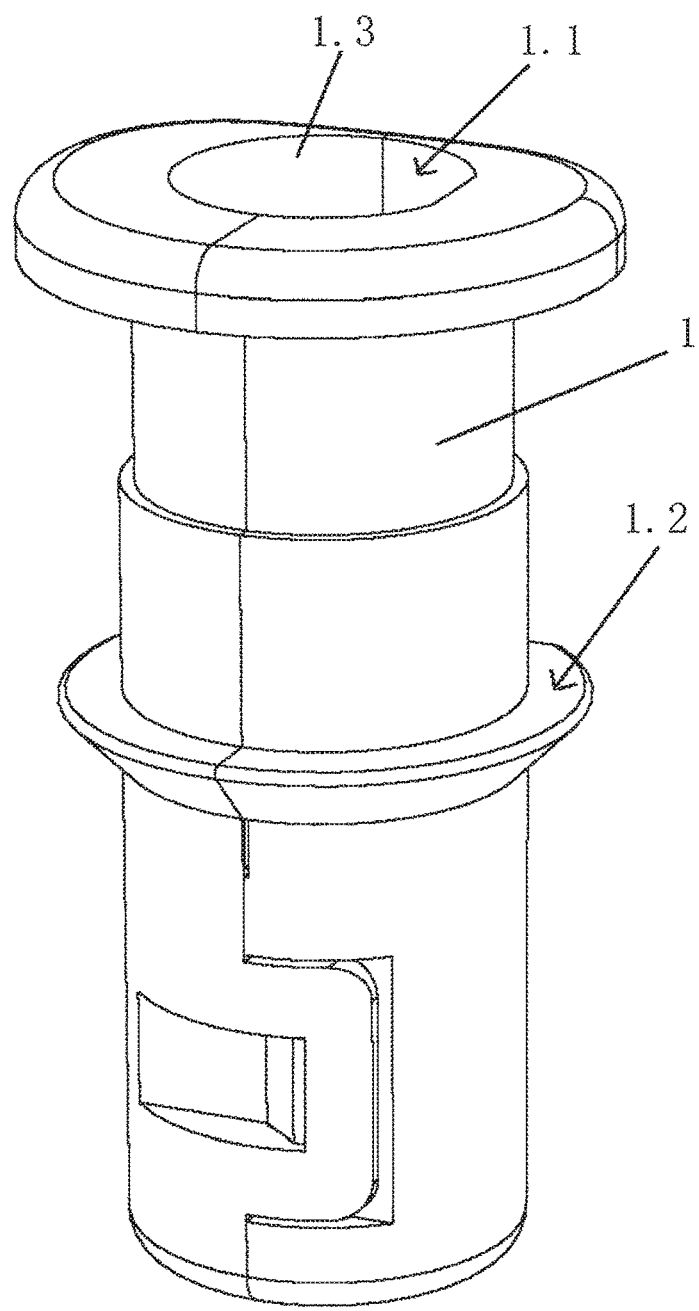
FIG. 3 is a schematic structural diagram of a squeaker provided by this utility model.
Figure 4:
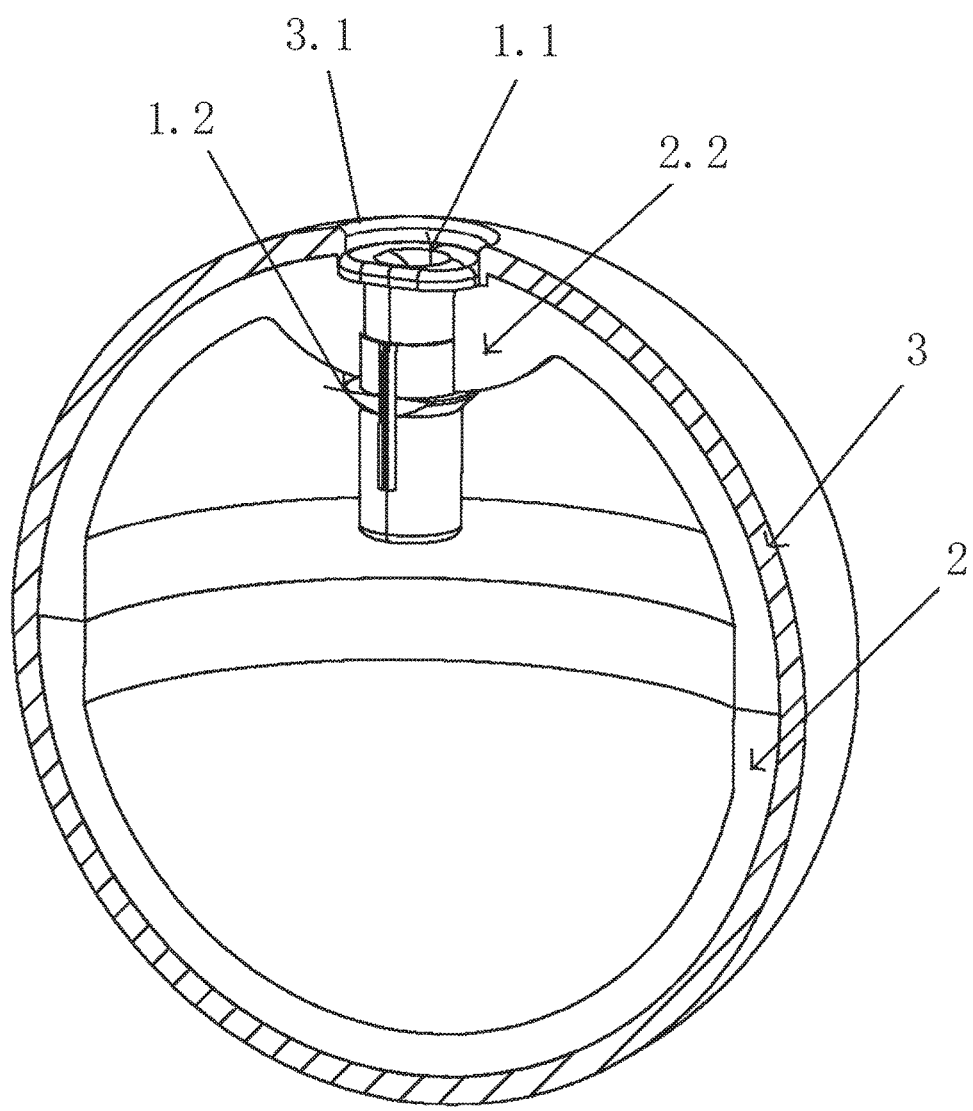
FIG. 4 is a sectional view of a squeaky pet toy provided by this utility model.
Figure 5:
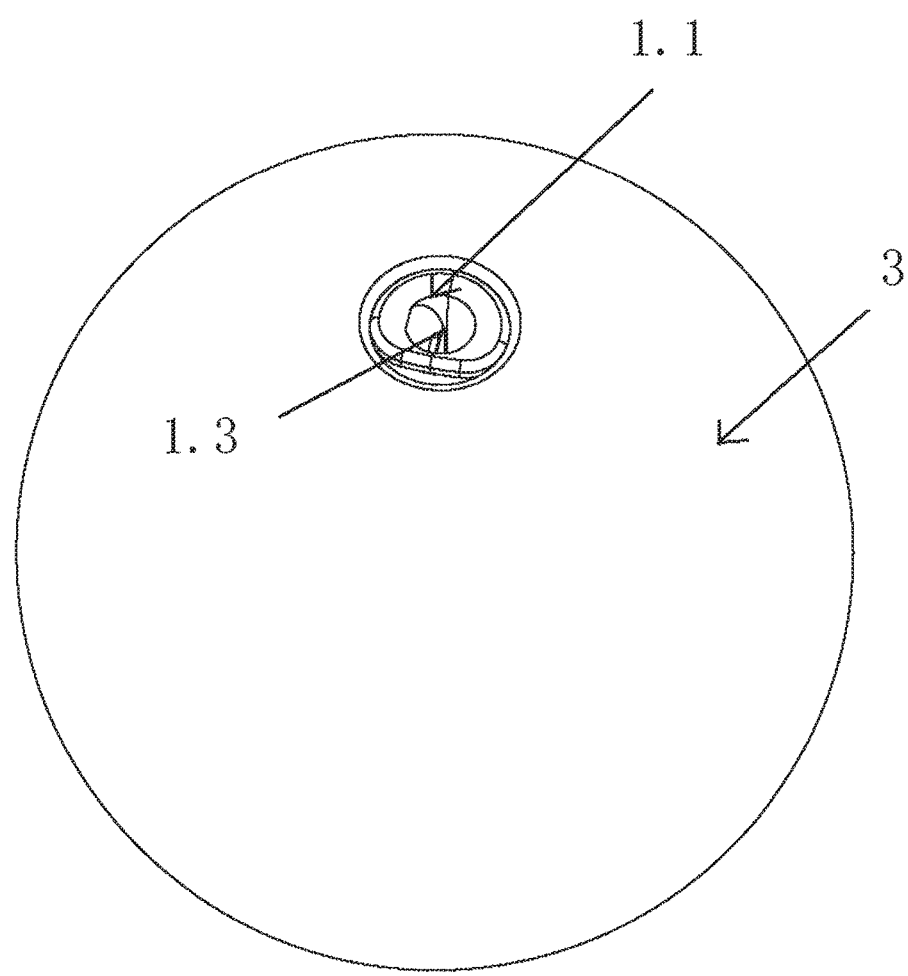
FIG. 5 is schematic diagram of an exterior of the squeaky pet toy provided by this utility model.

A squeaky pet toy shown in FIG. 1 and FIG. 2 includes a squeaker 1, a bladder 2, and an outer layer 3; the bladder 2 provided in this embodiment is spherical; the outer layer 3 is a felt layer; a squeaker mounting hole 2.1 is provided on the bladder 2; the squeaker 1 is provided in the mounting hole 2.1; the outer layer 3 is wrapped on a surface of the bladder 2; a first mounting inverse buckle 1.1 is provided on a top end of the squeaker 1. As shown in FIG. 3, FIG. 4, and FIG. 5, the first mounting inverse buckle of the squeaker does not interfere with the outer layer; the first mounting inverse buckle 1.1 is exposed from the outer layer 3; a second mounting inverse buckle 1.2 in the shape of annular ring is formed on an outer wall of the squeaker 1; a lower edge of the mounting hole 2.1 extends downwards to form a mounting boss 2.2, and the second mounting inverse buckle 1.2 is clamped below the mounting boss 2.2. The first mounting inverse buckle 1.1 is exposed from the outer layer 2, so that an opening 1.3 of the squeaker on a top surface of the first mounting inverse buckle 1.1 is exposed, thereby facilitating sound transmission. The lower edge of the mounting hole 2.1 on the bladder 2 extends towards a center of the bladder so as to form a mounting boss 2.2; further, the second mounting inverse buckle 1.2 is concave-arc shaped, so that the squeaker 1 is fastened in the bladder 2 and does not easily fall off therefrom.

Further, a through hole 3.1 with an inner diameter the same as that of the mounting hole 2.1 is provided on the outer layer 3, where the through hole 3.1 is aligned to the mounting hole 2.1. Providing the thorough hole 3.1 on the outer layer 3 can prevent the opening 1.3 of the squeaker from being covered by the outer layer, so that sound production of the squeaker is not affected.

Still further, the top surface of the first mounting inverse buckle 1.1 is lower than an upper edge of the through hole 3.1. If the top surface of the first mounting inverse buckle 1.1 protrudes from the through hole 3.1, on one aspect, appearance of the toy is affected, and on the other aspect, a top surface of the squeaker is easily worn out, and the product life is shortened.

The foregoing are merely exemplary descriptions of this utility model, and do not form limitation to the protection scope of this utility model; any design the same as or similar to this utility model shall fall within the protection scope of the present invention.

What is claimed is:

1. A squeaky pet toy, comprising a squeaker, a bladder, and an outer layer, wherein a squeaker mounting hole is provided on the bladder; the squeaker is provided in the mounting hole; the outer layer is wrapped on a surface of the bladder; a first mounting inverse buckle is provided on a top end of the squeaker, wherein, the first mounting inverse buckle of the squeaker does not interfere with the outer layer; a second mounting inverse buckle in the shape of annular ring is formed in the middle of an outer wall of the squeaker; a lower edge of the mounting hole extends downwards to form a mounting boss, and the second mounting inverse buckle clamped below the mounting boss.

2. The squeaky pet toy according to claim 1, wherein, a through hole with an inner diameter the same as that of the mounting hole is provided on the outer layer, wherein the through hole is aligned to the mounting hole.

3. The squeaky pet toy according to claim 2, wherein, a top surface of the first mounting inverse buckle is lower than an upper edge of the through hole.

4. The squeaky pet toy according to claim 1, wherein, the second mounting inverse buckle is concave-arc shaped.

5. The squeaky pet toy according to claim 1, wherein, the bladder is a bouncing ball.

6. The squeaky pet toy according to claim 1, wherein, the outer layer his a felt layer or cloth decorative layer.

* * * * *